United States Patent
Pickelman, Jr. et al.

(10) Patent No.: US 8,726,854 B2
(45) Date of Patent: May 20, 2014

(54) COOL LOGIC WITH AN INTEGRATED COOLER INTO THE CLUTCH/ENGINE BASE

(71) Applicants: Dale M. Pickelman, Jr., Marshall, MI (US); Thomas Tembreull, Homer, MI (US); Michael Cooper, Seattle, WA (US); Paul Crockett, Eaton Rapids, MI (US); Michael Hagedorn, Washington, DC (US); Justin Rumao, Canton, MI (US)

(72) Inventors: Dale M. Pickelman, Jr., Marshall, MI (US); Thomas Tembreull, Homer, MI (US); Michael Cooper, Seattle, WA (US); Paul Crockett, Eaton Rapids, MI (US); Michael Hagedorn, Washington, DC (US); Justin Rumao, Canton, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 13/942,521

(22) Filed: Jul. 15, 2013

(65) Prior Publication Data
US 2013/0299300 A1    Nov. 14, 2013

Related U.S. Application Data

(63) Continuation of application No. 13/319,089, filed as application No. PCT/US2010/033091 on Apr. 30, 2010, now Pat. No. 8,485,141.

(60) Provisional application No. 61/215,471, filed on May 6, 2009.

(51) Int. Cl.
*F01P 7/02* (2006.01)

(52) U.S. Cl.
USPC ............. 123/41.12; 192/82 T; 192/70.12; 192/85.61

(58) Field of Classification Search
CPC ...... F16D 35/022; F16D 35/026; F01P 7/042; F01P 7/044
USPC ............ 123/41.1, 41.12; 192/82 T, 58.64, 59, 192/85.61, 113.1, 113.21, 113.31
See application file for complete search history.

(56) References Cited

U.S. PATENT DOCUMENTS

| | | | |
|---|---|---|---|
| 3,804,219 A * | 4/1974 | Cummings, III | 192/82 T |
| 7,047,911 B2 * | 5/2006 | Robb et al. | 123/41.12 |
| 7,178,656 B2 * | 2/2007 | Pickelman et al. | 192/103 F |
| 7,249,664 B2 * | 7/2007 | Ignatovich et al. | 192/85.02 |

* cited by examiner

*Primary Examiner* — Hung Q Nguyen

(57) ABSTRACT

A fan drive system is provided having a housing connected with a pulley. A fan shaft is rotatably mounted to the housing by a clutch. A piston actuates the clutch. A pressure tube is provided for delivering pressure to the piston. A valve controls pressure against the piston. A fixed shaft rotatably supports the housing and the pulley and has passages extending through the pulley. A base connects the support shaft to a vehicle structure. An oil plate has inlets and outlets with the shaft passages. The oil plate circulates the hydraulic fluid. A coolant plate is juxtaposed between the oil plate and the structure supporting the support shaft. The coolant plate has inlets and outlets for coolant from a remote cooler.

8 Claims, 4 Drawing Sheets

COOL LOGIC WITH AN INTEGRATED COOLER INTO THE CLUTCH/ENGINE BASE

CROSS-REFERENCE TO RELATED APPLICATION

The present application is a continuation of U.S. patent application Ser. No. 13/319,089, filed on Nov. 6, 2011.

FIELD OF THE INVENTION

The invention relates generally to fan drive systems that are hydraulically controlled with integral cooling.

BACKGROUND OF THE INVENTION

Friction coupling devices and fluid coupling devices that drive radiator cooling fans for over the road trucks, such as class 8 trucks, are generally of two types, dry friction clutch assemblies and viscous drives, respectively.

Dry friction clutch assemblies tend to have two operating conditions "ON and OFF" referring to when a friction clutch is either fully engaged or fully disengaged. When a friction clutch assembly is providing cooling the clutch is fully engaged and not slipping. When the friction clutch assembly is not providing cooling the assembly is fully disengaged and slip speed is at a maximum between a clutch plate and an engagement surface.

The dry friction clutch assemblies generally have low thermal capacity, since they typically do not incorporate fluid flow cooling mechanisms. Thus, the clutch assemblies have minimal cooling capability and are unable to cycle repeat in short durations of time. Also, because of low thermal capacity, the clutch assemblies are also limited in torsional capacity, such that they are incapable of engaging at high engine revolutions per minute (rpm) or high engine speeds. The thermal energy that is generated during engagement at high engine rpm speeds can "burn up" or cause the clutch assembly to become inoperative.

Viscous drives, on the other hand, have become popular due to their ability to cycle repeat, engage at higher engine speeds, and have varying degrees of engagement. Viscous drives have an operating range of engagement and are generally less engaged at higher engine speeds and generally more engaged at lower engine speeds. Viscous drives are never fully engaged for internal viscous shear purposes.

Unfortunately, viscous drives are also thermally and torsionally limited. Viscous drives are always slipping to some degree causing them to be incapable of turning at fully engaged peak operating speeds or at higher speeds than originally designed. Since viscous drives are continuously slipping, they are continuously generating heat, unlike friction clutch assemblies. Viscous drives are further limited in that the more engine cooling needed, the larger and more costly the viscous drive and cooling fan that is required. Thus, for increased engine cooling requirements viscous drives can become impractical in size and cost.

Due to increased engine cooling requirements, it is desirable that a fan drive system be capable of not only providing an increased amount of cooling over traditional fan drive systems but also that it have the associated advantages of a friction clutch assembly and of a viscous drive, as stated above, without the associated disadvantages. It is also desirable that the fan drive system be practical and reasonable in size and cost and to be approximately similar to and preferably not to exceed that of traditional fan drive systems.

To overcome the disadvantages of both of the aforementioned traditional fan drive systems, a new fan drive system has been developed which can be referred to as a solenoid actuated hydraulically controlled fan drive system. A housing assembly is provided which is typically in the neighborhood of 12-16 inches in diameter. To minimize parasitic losses, the housing is not completely filled with hydraulic fluid, but is typically filled with the hydraulic fluid such that there is only 1-2 inches of the hydraulic fluid spaced around a circumference (assuming that the housing is being spun). The fan drive system is engine driven via a belt or chain driven pulley. A stationary bracket rotatably mounts the pulley to the chassis of the vehicle. The pulley is fixably connected to the housing assembly. A clutch assembly within the housing assembly is selectively engaged to connect the rotative fan with the housing assembly. To actuate the clutch, there is a need to provide hydraulic pressure. To provide the hydraulic pressure, a pitot tube is utilized. The pitot tube is fixably connected to the bracket. The velocity of the fluid, which is rotating within the housing, is utilized to generate pressure by entering into an aperture of the stationary pitot tube. The pitot tube is also fluidly connected with a piston engaging circuit which through a clutch friction pack engages a fan hub which is rotatably mounted to the housing assembly. To control the amount of engagement of the fan hub with the housing assembly via the friction pack, a hydraulic control arrangement is provided. The hydraulic control arrangement controls the pressure within the pitot tube by selectively connecting the pitot tube with a reservoir sump. The reservoir sump occurs due to the void of fluid in the center of the housing assembly. A solenoid actuated relief valve is utilized to selectively cut off a fluid connection of the pitot tube with the low pressure sump formed within the radial center of the housing assembly. To ensure a full engagement of the rotating fan hub with the housing (fan locked in position), the pitot tube interior is blocked off from the sump thereby causing full pressure to be utilized to actuate the friction pack which torsionally connects the fan hub with the housing assembly. To allow the amount of torsional connection between the housing and fan hub to vary, an electrical controller system is utilized to selectively open and close the solenoid motor thereby controlling the amount of pressure which is exerted on the clutch the friction pack by the piston.

As mentioned previously, for partial fan operation, the clutch of the fan drive is continually slipping. This continual slippage generates a high amount of heat. In many situations, the amount of slippage heat generated is greater than that which can be transferred to the surrounding air by convection from fins located upon the fan drive housing. Accordingly, in many prior fan drive systems, operation has been limited to fully on or off state of operation. It is desirable to provide a fan drive system with a hydraulically actuated clutch which is more tolerant of partial clutch engagement.

SUMMARY OF THE INVENTION

A hydraulically controlled fan drive system is provided having a housing which is connected with a pulley. A fan shaft is rotatably mounted to the housing with a hydraulically actuated clutch. A piston is slidably mounted within a piston housing for actuating the clutch and a pressure tube is provided for delivering kinetically pressurized hydraulic fluid pressure within the housing assembly to the piston. A controllable valve is provided for controlling fluid pressure within the piston housing. A bracket shaft rotatably supports the housing and the pulley and the bracket shaft has passages extending through the pulley. A base is connected with the shaft for connecting the shaft to a vehicle structure. An enclosed oil plate portion having inlets and outlets fluidly connected with bracket shaft passages is provided. The oil plate portion circumferentially in an alternating radial fashion circulates the hydraulic fluid. An enclosed coolant plate portion is provided juxtaposed between the oil plate portion and the structure supporting the shaft. The coolant portion has inlets and outlets for ingress and digress of the coolant from a remote cooler. The fan drive assembly of the present invention improves cooling characteristics which allows it to have optimal operation in periods of long term partial engagement of the fan shaft accordingly thereby allowing lower consumption of energy for cooling fan operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
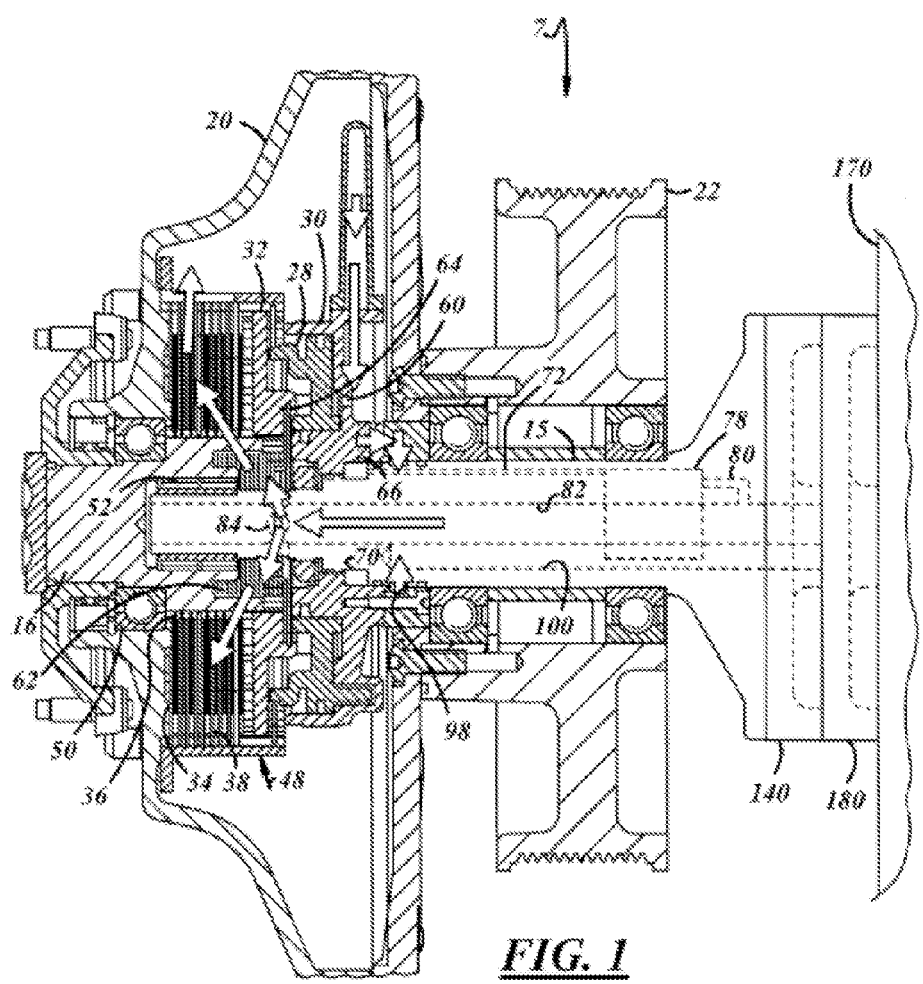
FIG. 1 is a top sectional view of a preferred embodied fan drive system according to the present invention.

The following description of the preferred embodiment(s) is merely exemplary in nature and is in no way intended to limit the invention, its application, or uses.

Referring now to FIGS. 1-6, a hydraulically controlled fan drive system 7 in accordance with an embodiment of the present invention is shown. The fan drive 7 uses rotational energy from a liquid cooled engine at an increased ratio to turn a radiator cooling fan (not shown) to provide airflow through a radiator (not shown). The system 7 includes a housing assembly 20 fixed to a pulley 22, which is coupled to and rotates relative to a crankshaft (not shown) of the vehicle's engine, via a pair of belts (not shown), within an engine compartment (not shown). The present invention may be relatively operative in relation to various components and via any number of belts or other coupling devices, such as a timing chain. The housing assembly 20 is mounted on the vehicle's engine via a mounting bracket shaft 15. The housing assembly 20 hydraulically engages a fan shaft during desired cooling intervals to reduce temperature of the vehicle's engine or to perform other tasks further discussed below.

The fan drive 7 includes a piston 28 slidably mounted in a non-rotative piston housing 30. The piston 28 when actuated by fluid pressure pushes on a pressure plate 32. Pressure plate 32 interacts with a friction pack 34. Friction pack 34 has a series of friction disks 36 spline connected along their interior diameter to a fan shaft 16 and friction disks 38 spline connected along their outer diameter to a cylindrical housing 48. The fan shaft 16 is connected by bearings 50 with the housing 20 along the housing inner diameter. The fan shaft 16 is connected by bearings 52 on a reduced diameter portion of the bracket shaft 15.

A stationary pitot tube 54 is provided. The pitot tube takes fluid kinetically pressurized within the housing 20 via an opening 56. The pressurized fluid entering opening 56 descends down the pitot tube 54 and is exposed to a pressure side of the piston 28 via an opening 60. Pressurizing the piston housing 30 on the side of the piston 28 exposed to the opening 60 causes the piston to move leftwardly as shown in FIG. 1 to engage the friction pack 34 to tortionally connect the fan shaft 16 with the housing 20. A spring 62 along with a spring retainer 64 is provided to return the piston 28 to its retracted position upon a release of pressurized fluid which is exposed to the right side of the piston 28.

The pressure within pitot tube 54 moves radially inward through a passage 66 of a pitot housing 68. The passage 66 intersects with a annular groove 70 provided within the bracket shaft 15. Groove 70 is intersecting with an axial line 72 provided in the bracket shaft 15. Axial line 72 is connected with a solenoid actuated valve 78 (only shown schematically) positioned within the shaft 15. Solenoid valve 78 can be controlled to selectively allow pressurized fluid in axial line 72 to be released through a pressure relief line 80. In other embodiments (not shown) solenoid valve 78 can be located remotely away from the bracket shaft 15. Pressure relief line 80 is intersecting with a central sump line 82. Sump line 82 is connecting with radial transverse lines 84 which deliver lubricated flow to the friction pack 34. The piston 28 will be fully engaged when it is desired to "lock" the fan shaft 16 with the housing 20 to provide for fan drive system operation at its fullest capacity. To achieve the above, the solenoid valve 78 is closed. To achieve partial operation of the fan drive 7, the solenoid actuated valve 78 is at least partially opened to allow fluid from the pitot tube 54 to leak into the exhaust line 82 via the relief line 80. The action of the solenoid valve 78 may be a proportional type solenoid valve or can be a pulse width modulated solenoid valve. When partial operation of the fan drive 7 is desired, there will be slippage between friction disks 36 and friction disks 38. The slippage generates substantial amount of heat which is removed by the hydraulic fluid (typically transmission oil) and escapes into the housing 20. Typically, the housing has thin fins 87 along its outer surface to aid in removal of heat from the transmission fluid within the housing 20. However, the convection cooling of the housing fins 87 can be less than optimal.

Figure 2:
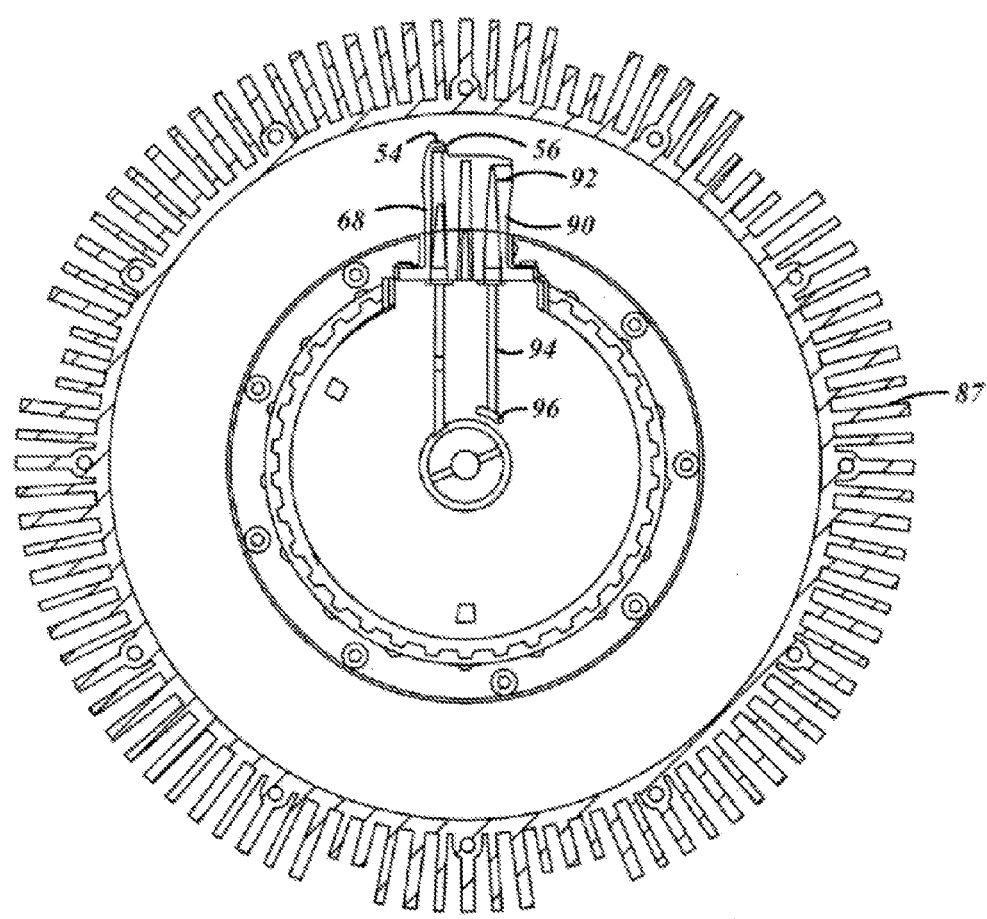
FIG. 2 is a cross sectional view of the fan drive system shown in FIG. 1.
Figure 3:
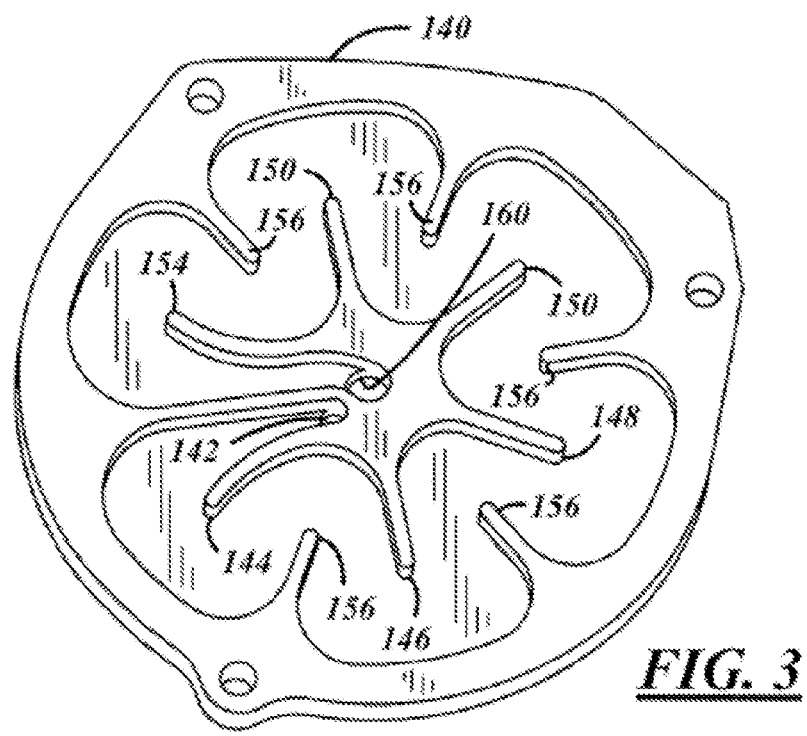
FIG. 3 is a perspective view of an oil plate utilized in the fan drive system shown FIG. 1.

The fan drive 7 also a pitot tube 90 having an opening 92. The pitot tube 90 is also provided by the common pitot tube housing 68. Pitot tube 90 fluidly communicates with a generally vertical passage 94. Passage 94 intersects with a generally axial passage 96 (FIG. 2). Axial passage 96 intersects with an annular bracket shaft groove or passage 98. Passage 98, via a radial passage (not shown), intersects with a bracket shaft supply axial passage 100.

Figure 4:
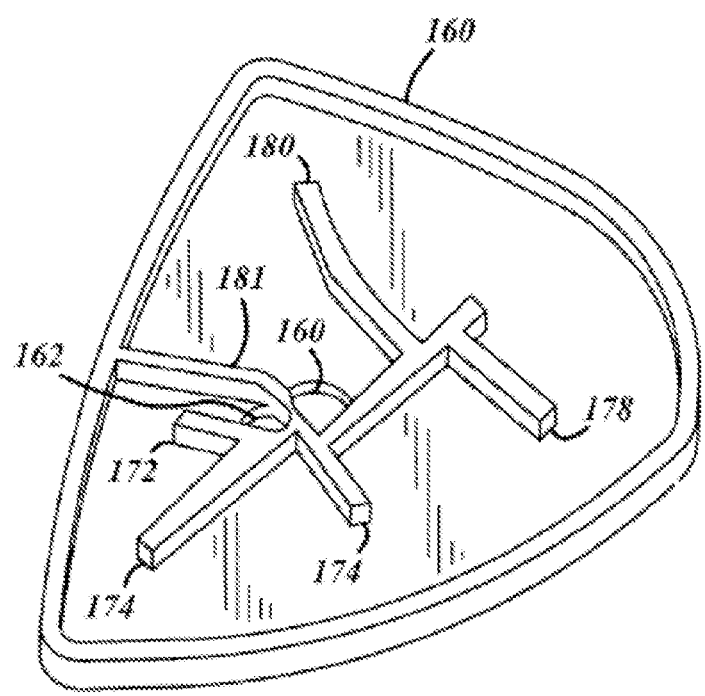
FIG. 4 is an alternative embodiment oil plate to that shown in FIG. 3.
Figure 5:
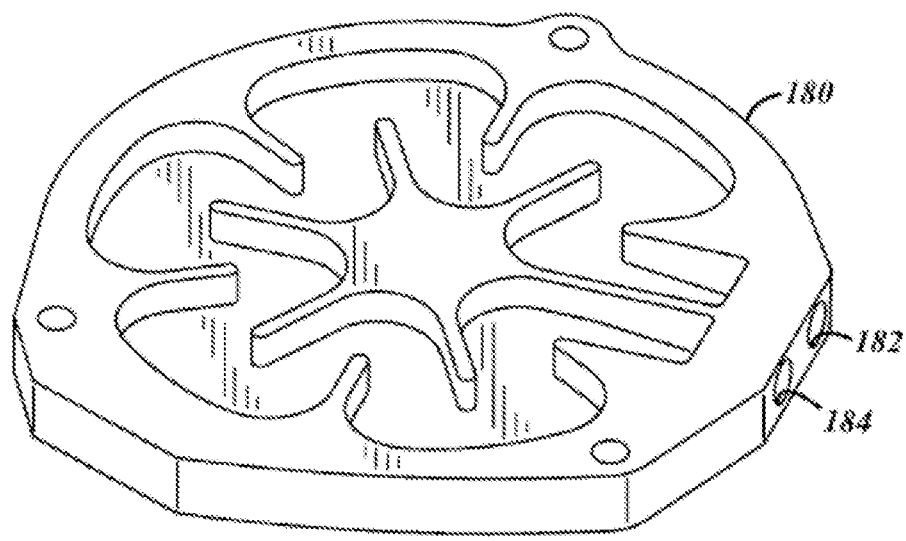
FIG. 5 is a perspective view of a coolant plate utilized in the fan drive system shown in FIG. 1.
Figure 6:
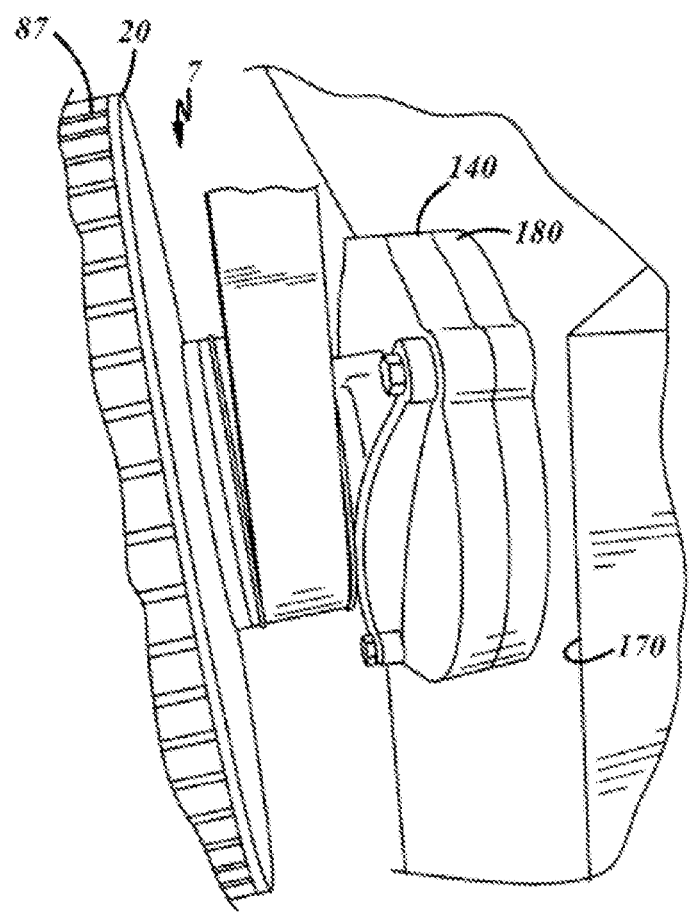
FIG. 6 is a perspective view of a portion of the fan drive system shown in FIG. 1 being connected with a structure provided by an internal combustion engine of a vehicle.

As shown to the right of the bracket shaft 15, the bracket shaft 15 is connected with an oil plate portion 140. The oil plate 140 can be fabricated from various materials including steel, copper or aluminum and it is typically preferable to have a material having a high thermal conductivity. The oil plate 140 has an entrance 142 to receive oil coming through passage 100. The oil plate 140 has a series of baffles 144, 146, 148, 150, 152 and 154 along a generally interior diameter which are bisected by a series of baffles 156 along its radial exterior. The baffles combine to provide a flow of oil through the oil plate 140 which is circumferentially alternating radial fashion as the oil flows towards the outer radial portion of the oil plate and then is directed towards inner radial portion of the oil plate maximizing the dwell time of the oil in the oil plate 40. The oil plate 140 has an exit 160 which is connected with the axial sump line 82. FIG. 4 provides an alternative embodiment oil plate wherein the bracket 15 has a more triangular base. Oil plate 160 has an entrance 162 and an exit 164 with a series of internal baffles 172, 174, 176, 178, 180 and 181.

Juxtaposed between the oil plate 140 and a structure typically provided by an engine block 170 of an internal combustion engine is a coolant plate 180. The coolant plate 180 has fluid entrances and exits 182 and 184. Coolant typically provided by a remote cooler such as by a vehicle radiator is brought to the coolant plate and circumferentially in an alternating radial fashion passes through the coolant plate picking up heat from the adjoining oil plate 140 and transferring the heat to the coolant which is delivered back to the engine's radiator or coolant system. Heat is also transferred from the coolant plate 140 to the engine block 170.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hydraulically controlled fan drive system comprising:
a housing assembly containing a hydraulic fluid;
a pulley connected to said housing assembly for turning said housing assembly;
a fan shaft rotatably connected to said housing by a hydraulically actuated clutch;
a piston slidably mounted with a piston housing for actuating said clutch;
a pressure tube for delivering kinetically pressurized hydraulic fluid pressure within said housing assembly to said piston housing;
a controllable valve for controlling the fluid pressure within said piston housing;
a bracket shaft rotationally supporting said housing and said pulley, said bracket shaft having passages extending through said pulley;
a base connected with said bracket shaft for connecting said bracket shaft with a structure;
a coolant plate member connected to said base and having a first recessed portion, said coolant plate member having inlets and outlets for ingress and digress of a coolant from a remote cooler into said recessed portion; and
an oil plate member juxtaposed between said coolant plate member and said bracket shaft and having a second recessed portion, said oil plate member having inlets and outlets fluidly connected with said bracket shaft passages;
wherein oil circulated into and through said second recessed portion is cooled by coolant circulated into and through said first recessed portion.

2. A fan drive assembly as described in claim 1 wherein said valve is located generally within said bracket shaft.

3. A fan drive assembly as described in claim 1 wherein said coolant plate portion circumferentially in an alternating radial fashion circulates said coolant.

4. A fan drive assembly as described in claim 1 wherein said oil plate portion in a circumferentially alternatively radial fashion circulates oil.

5. A fan drive system as described in claim 1 wherein said oil plate is fabricated from one of a group of materials including steel, copper and aluminum.

6. A fan drive assembly as described claim 1 having at least two pitot tubes, one of said pitot tubes being connected with said valve and a second pitot tube being provided for providing flow to said oil plate portion.

7. A fan drive system as described in claim 6 wherein said valve and said oil plate portion are provided with a common exhaust line connected with one of said passages in said bracket shaft.

8. A hydraulically controlled fan drive system comprising:
a housing assembly containing a hydraulic fluid;
a pulley connected to said housing assembly for turning said housing assembly;
a fan shaft rotatably mounted to said housing by a hydraulically actuated clutch;
a piston slidably mounted with a piston housing for actuating said clutch;
a first pressure tube for delivering kinetically pressurized hydraulic fluid pressure within said housing assembly to said piston housing;
a second pressure tube for delivering kinetically pressurized hydraulic fluid;
a controllable valve for controlling the fluid pressure within said piston housing;
a bracket shaft rotationally supporting said fan shafts, said housing and said pulley, said valve being positioned within said bracket shaft, said bracket shaft having a supply passage connected with said second pressure tube, and
said bracket shaft having an exhaust passage, said supply and said exhaust passages extending through said pulley; and
a base connected with said shaft for connecting said shaft with a structure, said base including:
an enclosed oil plate portion having an inlet connected with said bracket support supply passage and an outlet fluidly connected with said bracket shaft exhaust passage said oil plate portion having a first recessed portion and circumferentially in an alternating radial fashion circulating said hydraulic fluid; and
an enclosed coolant plate portion juxtaposed between said oil plate portion and the structure said coolant portion having a second recessed portion with inlets and outlets for ingress and digress of the coolant from a remote cooler, said cooler plate circulating said coolant in an circumferentially radially alternating fashion.

* * * * *